United States Patent
Kaneko et al.

(10) Patent No.: US 6,713,170 B1
(45) Date of Patent: Mar. 30, 2004

(54) HARD COATING MATERIAL AND FILM COMPRISING THE SAME

(75) Inventors: Shoichi Kaneko, Omiya (JP); Takeshi Takahashi, Yono (JP); Yoshitane Watanabe, Sodegaura (JP); Keitaro Suzuki, Sodegaura (JP); Osamu Tanegashima, Sodegaura (JP); Yoshinari Koyama, Sodegaura (JP)

(73) Assignees: Nippon Kayaku Kabushiki Kaisha, Tokyo (JP); Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/857,150
(22) PCT Filed: Dec. 8, 1999
(86) PCT No.: PCT/JP99/06880
§ 371 (c)(1),
(2), (4) Date: Aug. 27, 2001
(87) PCT Pub. No.: WO00/34396
PCT Pub. Date: Jun. 15, 2000

(30) Foreign Application Priority Data

Dec. 9, 1998 (JP) ............................................. 10-349806

(51) Int. Cl.$^7$ .............................. B32B 5/16; B32B 7/02; D06N 7/04; C09D 1/00
(52) U.S. Cl. ........................ 428/323; 428/328; 428/330; 428/331; 428/402; 428/409; 428/143; 428/148; 428/149; 428/206; 428/212; 428/217; 106/286.6; 106/286.34
(58) Field of Search .................. 516/34, 79; 106/286.6, 106/286.34; 428/323, 328, 330, 331, 402, 409, 143, 148, 149, 206, 212, 217

(56) References Cited

U.S. PATENT DOCUMENTS

| 4,682,192 A | | 7/1987 | Nomura et al. ............. 503/200 |
| 5,747,152 A | * | 5/1998 | Oka et al. ................... 428/323 |
| 6,291,535 B1 | * | 9/2001 | Watanabe et al. ............. 516/34 |

FOREIGN PATENT DOCUMENTS

| JP | 3-6265 | | 1/1991 |
| JP | 3-143975 | | 6/1991 |
| JP | 4-202366 | | 7/1992 |
| JP | 5-117552 | | 5/1993 |
| JP | 07-069621 | * | 3/1995 |
| JP | 8-238683 | | 9/1996 |
| JP | 8-311240 | | 11/1996 |

OTHER PUBLICATIONS

Patent Abstracts of Japan vol. 006, No. 044 (C–095), Mar. 19, 1982 & JP 56 160348 A (Daiichi Kasei KK), Dec. 10, 1981.
Patent Abstracts of Japan vol. 016, No. 577 (P–1460), Dec. 16, 1992 & JP 04 223401 A (Nikon Corp), Aug. 13, 1992.

* cited by examiner

Primary Examiner—Holly Rickman
(74) Attorney, Agent, or Firm—Nields & Lemack

(57) ABSTRACT

The present invention provides heat-curable or UV-curable transparent hard coating materials suitable for forming a low refractive antireflection coating on a substrate such as a film or sheet to reduce reflection of external light or increase light transmittance.

A UV-curable or heat-curable transparent hard coating material comprising a UV-curable resin having one or more (meth)acryloyl groups in one molecule or a heat-curable resin and silica-magnesium fluoride hydrate composite colloidal particles such that the transparent film obtained by curing said transparent hard coating material has a refractive index of 1.48 or less.

5 Claims, No Drawings

HARD COATING MATERIAL AND FILM COMPRISING THE SAME

FIELD OF THE INVENTION

The present invention relates to transparent hard coating materials comprising silica-magnesium fluoride hydrate composite colloidal particles and a UV-curable or heat-curable resin suitable for use as antireflection coating materials for lenses, transparent plastics, plastic films and surface of display screens such as cathode ray tubes or liquid crystal displays, and more specifically to hard coating materials for conferring scratch resistance and chemical resistance on the surfaces of films or sheets of plastics such as polyesters, acrylics, polycarbonates, TAC (triacetate) or glasses and forming a hard coating layer with high transparency and low refractivity.

BACKGROUND OF THE INVENTION

Generally, the surfaces of lenses, transparent plastics, plastic films and surface of display screens such as cathode ray tubes or liquid crystal displays are subjected to antireflection treatments to reduce reflection of external light such as sunlight or electric light and increase light transmittance. Antireflection treatments are typically effected by a vacuum deposition method or a coating method, in which a low refractive material such as magnesium fluoride or silica is used for the outermost layer. In this case, magnesium fluoride sols and silica sols are known to be effective as microfillers for antireflection coating materials.

Magnesium fluoride sols have been reported as follows. JP 64041149A proposes a method for conferring antireflective properties by coating the screen panel of a cathode ray tube with a sol liquid comprising magnesium fluoride microparticles having a particle diameter of 100–200 angstroms. However, no processes for preparing this sol are described. JP 2026824A proposes aqueous and organo magnesium fluoride sols having a light transmittance of 50% or more, coated products obtained by applying and drying said sols on the surface of a substrate as well as a process for preparing an aqueous magnesium fluoride sol comprising the steps of reacting an aqueous solution of a magnesium salt with an aqueous solution of a fluoride by a simultaneous addition method to produce gel-like precipitates followed by heating and aging the resulting reaction solution and then removing electrolytes in the solution. Colloidal particles of magnesium fluoride obtained by this process have a very small particle diameter of 100–120 angstroms. However, sols obtained by adding an aqueous solution of potassium fluoride to an aqueous solution of magnesium chloride are reported to be opaque white and have a colloidal particle diameter of 100–300 angstroms and a transmittance of 20% or less. JP 7069621A discloses a magnesium fluoride hydrate sol and a process for the process thereof as well as the use thereof as an antireflection coating material.

Many proposals have been made about silica sols, and JP 80122501A discloses antireflection film having a low refractive index which comprises a silica sol having a particle diameter of 5–30 nm and a hydrolyzate of alkoxysilane. However, a silica-magnesium fluoride composite sol has not been reported to date.

When the magnesium fluoride and magnesium fluoride hydrate colloidal particles described above are used as antireflection coating materials, an organic or inorganic binder is needed because the bond strength of the coating materials is weak. Magnesium fluoride and magnesium fluoride hydrate sols have a low refractive index, but their bond strength to binders is weak so that the resulting films have an insufficient strength. Silica sols have a sufficient bond strength, but their refractive index is not sufficiently low so that the films prepared by combining them with an organic binder have a high strength but not a low refractive index. Therefore, there is a demand for the development of a composition for conveniently providing an antireflection coating having a lower refractive index and a good film strength.

DISCLOSURE OF THE INVENTION

As a result of our earnest investigations to solve the above problems, we accomplished the present invention. Accordingly, the present invention relates to:

(1) a transparent hard coating material comprising a UV-curable resin having one or more (meth)acryloyl groups in one molecule or a heat-curable resin and silica-magnesium fluoride hydrate composite colloidal particles such that the transparent film obtained by curing said transparent hard coating material has a refractive index of 1.48 or less;

(2) the transparent hard coating material as defined in (1) wherein the silica-magnesium fluoride hydrate composite colloidal particles have an average particle diameter of 0.5 $\mu$m or less;

(3) the transparent hard coating material as defined in (1) or (2) wherein the silica-magnesium fluoride hydrate composite colloidal particles are obtained from a sol of silica-magnesium fluoride hydrate composite colloidal particles having a ratio of silica to magnesium fluoride hydrate ($MgF_2 \cdot nH_2O$ where n is 0.25–0.5) of 0.01–5 in an $SiO_2/MgF_2$ weight ratio, and a primary particle diameter of 5–50 nm;

(4) the transparent hard coating material as defined in (3) wherein the sol of silica-magnesium fluoride hydrate composite colloidal particles is an organosol;

(5) the transparent hard coating material as defined in (4) wherein the organosol of silica-magnesium fluoride hydrate composite colloidal particles is obtained by the steps of:
 (a) adding an aqueous solution of fluorides to a mixture of a silica sol having a primary particle diameter of 3–20 nm and an aqueous solution of magnesium salts in an F/Mg molar ratio of 1.9–2.1 to produce a slurry comprising aggregates of silica-magnesium fluoride hydrate composite colloidal particles,
 (b) removing by-produced salts in the slurry obtained in step (a), and
 (c) replacing water of the aqueous sol obtained in step (b) with an organic solvent; and (6) a film having a hard coating layer obtained by applying and curing the transparent hard coating material as defined in any one of (1) to (5).

BEST EMBODIMENT FOR CARRYING OUT THE INVENTION

The present invention is explained in detail below.

The transparent hard coating materials of the present invention comprises a UV-curable resin having one or more (meth)acryloyl groups in one molecule acting as a UV-curable resin binder or a heat-curable resin acting as a heat-curable resin binder and silica-magnesium fluoride hydrate composite colloidal particles. These transparent hard coating materials can be cured by irradiation with UV light or heating to form a transparent cured film having a refractive index of 1.48 or less.

UV-curable resins having one or more (meth)acryloyl groups in one molecule used in the invention preferably have a refractive index as low as possible, for example, that lower than about 1.48. For example, in order to primarily increase the strength of the coating film such as scratch resistance and solvent resistance, polyfunctional acrylates having two or more (meth)acryloyl groups are preferable. These UV-curable resins function as a binder resin for binding between silica-magnesium fluoride hydrate composite colloidal particles and between the particles and a substrate.

Specific examples of UV-curable resins having one (meth)acryloyl groups in one molecule include, for example, trifluoroethyl acrylate, trifluoromethyl acrylate, phenylglycidyl acrylate, hydroxyethyl (meth)acrylate, tetrahydrofurfuryl acrylate, acryloyl morpholine, N-vinylpyrrolidone and N-vinyl-ε-caprolactam.

Polyfunctional acrylates having two or more (meth) acryloyl groups include, for example, polyol poly(meth) acrylates such as neopentylglycol di(meth)acrylate, 1,6-hexanediol di(meth)acrylate, trimethylolpropane tri(meth) acrylate, ditrimethylolpropane tetra(meth)acrylate, pentaerythritol tetra(meth)acrylate, pentaerythritol tri(meth) acrylate, dipentaerythritol hexa(meth)acrylate; epoxy (meth) acrylates such as di(meth)acrylate of bisphenol A diglycidyl ether, di(meth)acrylate of neopentylglycol diglycidyl ether, di(meth)acrylate of 1,6-hexanediol diglycidyl ether; polyester (meth)acrylates obtained by esterifying a polyhydric alcohol and a polyhydric carboxylic acid and/or the anhydride thereof and an acrylic acid; urethane (meth)acrylates obtained by reacting a polyhydric alcohol, a polyisocyanate and a hydroxyl-containing acrylate, and polysiloxane poly (meth)acrylates.

In addition to the above monofunctional or polyfunctional acrylates having one or more (meth)acrylate groups, UV-curable resins having a low refractive index, fluorine-containing monomers, thermoplastic polymers having a low refractive index or the like can also be used alone or in combination. When these resins are used in combination, the proportions of these resins, monomers and/or polymers to be used are appropriately determined depending on the antireflective effect, scratch resistance, solvent resistance or other properties of the surface.

Low refractive index UV-curable resins to be used in the present invention preferably include, for example, low refractive index fluoroacrylates such as trifluoroacrylate (refractive index=1.32). Other preferred examples of low refractive index UV-curable resins are UV-curable silicone resins (for example, X-12-2400 from Shin-Etsu Chemical). Suitable fluoromonomers include, for example, $CF_2=CF_2$, $CH_2=CF_2$, $CF_2=CHF$ and the like, and suitable low refractive index thermoplastic polymers preferably include, for example, fluorine containing polymers because of their low refractive indices of 1.45 or less. Polymers or block polymers of fluorine containing monomers may also be used. Polymers modified with fluorine at the backbone include, for example, PTFE, PVDF, PVF and the like. These polyfunctional acrylates are preferably added in smaller amounts in respect of refractive index, but polyfunctional acrylates having two or more unsaturated groups are preferably added in a weight ratio of the polyfunctional acrylates having two or more unsaturated groups to low refractive resins of 100/0 to 30/70 in order to obtain an improved scratch resistance.

The transparent hard coating materials of the present invention may contain a stainproof surfactant (dispersant) to prevent surface staining. Examples of stainproof surfactants include, for example, silicone-based surfactants, fluorine-based surfactants and the like. For the purpose of improving adhesion between hard coating materials and a substrate, it may further comprise other polymers in addition to the above resins. Polymers added for this purpose include acrylic resins, polyester resins, butyral resins and the like. Acrylic resins and polyester resins are especially preferable.

The transparent hard coating materials of the present invention using a UV-curable resin normally comprise a photopolymerization initiator. Photopolymerization initiators to be used are not specifically limited, but various types thereof can be used. Specific examples of suitable photopolymerization initiators include Irgacure 184, Irgacure 651 (Ciba-Geigy), Darocure 1173 (Merck), benzophenone, methyl benzoylbenzoate, p-dimethyl benzoate ester, thioxanthone and the like. The contents of these photopolymerization initiators are preferably 1–20% by weight based on the solid content of the composition.

Specific examples of heat-curable resins to be used in the present invention include silicone-based hard coating materials such as partial hydrolyzates of aminosilane-epoxysilane, partial hydrolyzates of silane coupling agent-alkyl trialkoxysilane-tetraalkoxysilane, partial hydrolyzates of alkyl trialkoxysilane-tetraalkoxysilane, hydrolyzates of colloidal silica-alkyl trialkoxysilane and hydrolyzates of alkyl silane fluoride-alkoxysilane; and organic hard coating materials such as melamine resins, urethane resins, alkyd resins and acrylic resins. Among these heat-curable resins, silicone-based hard coating materials are more preferable in order to readily obtain cured layers having a refractive index of 1.48 or less.

Heat-curable resins may contain a catalyst to accelerate heat curing.

The transparent hard coating materials of the present invention may also comprise an organic solvent. Specific examples of suitable organic solvents include aromatic hydrocarbons such as toluene and xylene; ketones such as methyl ethyl ketone; esters such as ethyl acetate; alcohols such as methanol and ethanol.

Preferably, silica-magnesium fluoride hydrate composite colloidal particles to be used in the present invention have an average particle diameter of 0.5 μm or less and are obtained via the steps of:

(a) adding an aqueous solution of fluorides to a mixture of a silica sol having a primary particle diameter of 3–20 nm, preferably 4–8 nm and an aqueous solution of magnesium salts in an F/Mg molar ratio of 1.9–2.1 to produce a slurry comprising aggregates of silica-magnesium fluoride hydrate composite colloidal particles, (b) removing by-produced salts in the slurry obtained in step (a); and (c) replacing water of the aqueous sol obtained in step (b) with an organic solvent.

Silica sols to be used in step (a) can be prepared by a process of subjecting the starting water-glass to the steps of ion exchange, heating, growing particles and concentration or a process of hydrolyzing ethyl silicate (or methyl silicate) or other processes, or may be commercially available. Silica sols having a primary particle diameter of 3–20 nm, especially 4–8 nm are preferred. Silica sols having a primary particle diameter of less than 3 nm are not preferable because they are readily gelled so as to make a silica-magnesium fluoride hydrate composite sol less stable. Silica sols having a primary particle diameter of more than 20 nm are also not preferable because the use of such sols results in the reduction of transparency and performances of composite colloid (refractive index, binding properties). The primary particle diameter is determined by the BET method, the Sears method or electron microscopy. The above silica sols normally have a pH of 2–10 and is applicable to the present invention.

Suitable magnesium salts to be used in step (a) are water-soluble salts such as magnesium chloride, magnesium nitrate, magnesium sulfate, magnesium sulfamate, magnesium acetate, magnesium formate, and these salts may be used alone or in combination. These may be used as normal salts or acidic salts.

Suitable fluorides to be used in step (a) are water-soluble salts such as sodium fluoride, potassium fluoride, cesium fluoride, rubidium fluoride, ammonium fluoride, guanidine fluoride, quaternary ammonium fluoride, acidic ammonium fluoride and hydrogen fluoride, and these salts may be used alone or in combination.

In step (a), the pH of a mixture of a silica sol and an aqueous solution of magnesium salts is preferably adjusted to 3–6 by using an acidic silica sol having a pH of 2–5, an acidic magnesium salt, an acidic fluoride salt or, if necessary, an acid because it is not stable in an alkaline condition. The concentration of the mixture depends on the primary particle diameter of the silica sol used, but should be selected so that silica gels are not produced.

Step (a) can be performed, for example, by adding an aqueous solution of fluorides to a mixture of a silica sol having a primary particle diameter of 3–20 nm and an aqueous solution of magnesium salts in an F/Mg molar ratio of 1.9–2.1 to produce a slurry comprising aggregates of silica-magnesium fluoride hydrate composite colloidal particles. The molar ratio may be less than 1.9, but unreacted magnesium salts increase to give an unfavorable effect on efficiency. Molar ratios of more than 2.1 are also not preferable because free fluorine ions in the slurry of silica-magnesium fluoride hydrate composite colloidal particles produced in step (a) become excessive and, especially when the pH of the slurry is low, much colloidal silica in the composite colloid dissolves in the form of fluorosilicic acid during the washing process in step (b). Addition and mixing of an aqueous solution of fluorides to a mixture of a silica sol and an aqueous solution of magnesium salts can be performed at a temperature of 0–100° C. with stirring for 0.1–10 hours using a Satake type mixer, a Pfaudler type mixer, a disper, a homogenizer or the like. The concentration of this silica-magnesium fluoride hydrate composite colloid produced in step (a) is preferably adjusted to 0.1–10% by weight.

After a solution comprising a silica sol and an aqueous solution of magnesium salts is mixed with an aqueous solution of fluorides in step (a), the pH of the mixture is preferably 3–6. At a pH lower than 3, excessive colloidal silica reacts with fluorine ions and dissolves in the form of fluorosilicic acid during the washing process in step (b). At a pH higher than 6, aggregation by silica becomes so prominent as to make it difficult to obtain a highly transparent sol after desalting. Especially preferred is pH 3–5. The temperature in step (a) is 0–100° C. A temperature higher than 100° C. is not preferable because dehydration proceeds. The period of time of step (a) is 0.1–10 hours. The period of time shorter than 0.1 hours is allowable but not preferable because of insufficient mixing. The period of time longer than 10 hours is allowable but not preferable because the preparation time is unnecessarily prolonged.

In step (a), $Mg^+$ is adsorbed or bound to the silanol groups of colloidal silica particles, so that silica colloidal particles and magnesium fluoride hydrate particles bind together or magnesium fluoride hydrate is bound on the surfaces of silica particles to form composite colloidal particles during the formation of magnesium fluoride hydrate colloidal particles. In addition, colloidal silica also behaves as a dispersant to produce fine colloidal particles by inhibiting particle growth of the magnesium fluoride hydrate produced. The silica-magnesium fluoride hydrate composite colloidal particles produced are not separated into silica particles and fluoride magnesium hydrate particles even by removing salts in step (b) or solvent replacement in step (c). The ratio of silica to magnesium fluoride hydrate in step (a) is preferably 0.01–5, more preferably 0.05–2 in an $SiO_2/MgF_2$ weight ratio.

In step (a), composite colloidal particles of colloidal silica having a primary particle diameter of 3–20 nm and magnesium fluoride hydrate having a primary particle diameter of 5–20 nm aggregate to form a sol-like slurry. When this slurry is allowed to stand, silica-magnesium fluoride hydrate composite colloidal aggregates precipitate. This aggregation results from the high concentration of salts by-produced in step (a). The concentration of the silica-magnesium fluoride hydrate composite colloid in step (a) is 0.1–10% by weight as $SiO_2+MgF_2$. The concentration less than 0.1% by weight may be allowable, but efficiency is lowered, and the concentration higher than 10% by weight may be allowable, but reaction becomes non-homogeneous. Most preferred is 0.5–5.0% by weight.

In step (b), by-produced salts are removed from the slurry comprising the aggregates of silica-magnesium fluoride hydrate composite colloidal particles obtained by step (a). Removal of the by-produced salts results in the reduction of the size of the aggregates of silica-magnesium fluoride hydrate composite colloidal particles and gives a sol comprising silica-magnesium fluoride hydrate composite colloidal particles.

By-produced salts can be removed by a filtering-and-washing method using a membrane filter such as an ultrafiltration membrane, a reverse osmosis membrane or the like, ion exchange, sedimentation, etc., but most preferably by a filtering-and-washing method using an ultrafiltration membrane. If necessary, a filtering-and-washing method may be used in combination with other methods. Especially, by-produced salts can be more effectively removed by using a tube-type ultrafiltration membrane. Ultrafiltration is normally performed at 0–80° C., but the temperature depends on the material of the membrane. Preferably it performed with continuous or intermittent water feeding to sufficiently remove the salts. Filtration time is not specifically limited, but normally 1–50 hours. After the ultrafiltration, the sol may be subjected to cation exchange in order to improve its transparency.

The temperature in step (b) is 0–80° C., more preferably from room temperature to 60° C., because higher temperatures are effective for filtration speed but accelerate dehydration. The period of time is 1–50 hours. Filtration time longer than 50 hours is allowable but not preferable because the preparation time becomes prolonged. The water used for washing in step (b) may be pure water, but preferably the pH of the water is adjusted to 3–6 by adding to water an acid such as hydrochloric acid, if necessary.

The sol comprising silica-magnesium fluoride hydrate composite colloidal particles obtained in step (b) has a primary particle diameter of 5–50 nm as observed by electron microscopy. The primary particle diameter is the particle diameter of one silica-magnesium fluoride hydrate composite colloidal particle rather than the particle diameter of aggregated silica-magnesium fluoride hydrate composite colloidal particles, and can be determined by electron microscopy. The silica-magnesium fluoride hydrate composite sol obtained in step (b) has an $SiO_2/MgF_2$ weight ratio of 0.01–5 and a silica-magnesium fluoride hydrate composite colloid concentration of 2–20% by weight. The concentration lower than 2% by weight is allowable but not preferable because the sol is further diluted by mixing with binders when it is used. The concentration higher than 20% by weight is allowable but not preferable because the sol becomes too viscous for handling. The pH of the aqueous sol of silica-magnesium fluoride hydrate composite colloidal particles obtained in step (b) is preferably 3–6.

In the aqueous sol or organosol obtained in step (b), silica-magnesium fluoride hydrate composite colloidal particles exist alone or form microaggregate particles and are sufficiently transparent as such. If microaggregate particles are relatively large, however, the size thereof can be mechanically reduced with a disper, homogenizer, ultrasonic homogenizer or the like to obtain an improved transparency, if desired.

Water of the aqueous sol comprising silica-magnesium fluoride hydrate composite colloidal particles obtained in step (b) can be replaced with an organic solvent by a standard method under reduced or normal pressure to give an organosol of said composite colloidal particles (step (c)). Suitable organic solvents used in this step include methanol, ethanol, isopropanol, n-propanol, DMF, DMAC, ethylene glycol, propyl cellosolve and the like, which may be used alone or in combination. A temperature during solvent replacement depends on a boiling point of a solvent, but solvent replacement is preferably performed at a temperature as low as possible under reduced pressure to prevent dehydration of magnesium fluoride hydrate during the solvent replacement.

The concentration of the organosol of silica-magnesium fluoride hydrate composite colloidal particles obtained in step (c) is preferably 2–20% by weight. The concentration lower than 2% by weight is allowable but not preferable because the sol is further diluted by mixing with binders when it is used. The concentration higher than 20% by weight is also allowable but not preferable because the sol becomes too viscous for handling.

This organosol can be further treated with a silane coupling agent and subjected to solvent replacement to give a sol comprising other organic solvent, e.g. ketones such as methyl ethyl ketone, ethyl acetate, toluene, etc.

Silica-magnesium fluoride hydrate composite colloidal particles used in the present invention have a primary particle diameter of 5–50 nm as observed by electron microscopy. The diameter larger than 50 nm is not preferable because the transparency of the antireflection coating is lowered. The silica-magnesium fluoride hydrate composite colloidal particles tend to have a larger primary particle diameter as the reaction temperature in step (a) increases.

Silica-magnesium fluoride hydrate composite colloidal particles used in the present invention have a low refractive index and a high transparency, so that a good antireflective effect can be attained by using a sol comprising the silica-magnesium fluoride hydrate composite colloidal particles.

The UV-curable transparent hard coating materials of the present invention can be obtained, for example, by dissolving a UV-curable resin having one or more (meth)acryloyl groups in one molecule and a photopolymerization initiator in a solvent such as toluene, methanol, isopropyl alcohol (IPA) and then adding the thus obtained solution to an organosol of silica-magnesium fluoride hydrate composite colloidal particles, preferably a methanolic sol of silica-magnesium fluoride hydrate composite colloidal particles, to form a homogeneous mixture. The ratio between a UV-curable resin having one or more (meth)acryloyl groups in one molecule and silica-magnesium fluoride hydrate composite colloidal particles depends on the desired refractive index, but the UV-curable resin/colloidal particles ratio (weight ratio) is preferably 90/10–10/90 in order to obtain a transparent cured film having a refractive index of 1.48 or less and preferably 80/20–30/70 in respect of the hardness of the cured film. If the content of the UV-curable resin as a binder resin is too small, the strength of the coating film is lowered. If it is too high, the refractive index is not lowered.

The UV-curable transparent hard coating materials of the present invention can be used to provide a hard coating layer, for example, by applying a coating material of the present invention on a substrate with a coater such as a gravure coater, a reverse coater and a microreverse coater so as to obtain a cured film having a thickness of 0.1–1.0 $\mu m$, drying the coating material and then curing it under UV irradiation to form a cured coating film (hard coating layer). Specific examples of substrates on which the UV-curable transparent hard coating materials of the present invention can be applied include films and sheets obtained from polyester resins, polycarbonate resins, triacetate resins and acrylic resins as well as glass lenses, plastic lenses, glass plates, transparent plastic plates, surface of display screens such as cathode ray tubes or liquid crystal displays, and the like.

The heat-curable transparent hard coating materials of the present invention having a low refractive index can be obtained, for example, by adding a heat-curable resin as mentioned above to an organosol comprising silica-magnesium fluoride hydrate composite colloidal particles, preferably a methanolic sol comprising silica-magnesium fluoride hydrate composite colloidal particles, to form a homogeneous mixture. The ratio between the heat-curable resin and silica-magnesium fluoride hydrate composite colloidal particles varies with the desired refractive index, but the heat-curable resin/colloidal particles ratio (weight ratio) is preferably 90/10–10/90 in order to obtain a transparent cured film having a refractive index of 1.48 or less and preferably 80/20–30/70 in respect of the hardness of the cured film. If the content of the heat-curable resin as a binder resin is too small, the strength of the coating film is lowered. If it is too high, the refractive index is not lowered.

The heat-curable transparent hard coating materials of the present invention can be used to provide a hard coating layer, for example, by applying a coating material of the present invention on a substrate with a coater such as a gravure coater, a reverse coater and a microreverse coater so as to obtain a cured film having a thickness of about 0.1 $\mu m$ and drying the coating material followed by heating at a temperature of 50–150° C. to form a cured coating film (hard coating layer). Specific examples of suitable substrates include films and sheets obtained from polyester resins, polycarbonate resins, triacetate resins, acrylic resins and the like as well as glass lenses, plastic lenses, glass plates, transparent plastic plates and surface of display screens such as cathode ray tubes or liquid crystal displays.

The hard coating materials of the present invention having a low refractive index can be used to prepare an antireflection coating as follows. In order to prepare an antireflection coating, a transparent hard coating material of the present invention having a refractive index lower than the refractive index of a substrate such as plastic film or glass as mentioned above may be applied on the substrate to form a layer. An antireflection coating having a higher antireflective effect can be obtained by forming a layer having a higher refractive index than that of the substrate between the substrate and the layer of the transparent hard coating material of the present invention. The refractive index of the cured layer must be lower than that of the substrate, approximately 1.48 or less, more preferably 1.42 or less, most preferably 1.38 or less. This cured layer is preferably provided in the form of a thin film having a thickness of 1 μm or less, more preferably 0.3 μm or less in respect of antireflective effect.

Aqueous sols and organosols comprising silica-magnesium fluoride hydrate composite colloidal particles used in the claimed invention have a primary particle diameter of 5–50 nm and also have a good transparency and dispersibility and a low refractive index of 1.3–1.4. The transparent hard coating materials of the present invention comprising a sol of silica-magnesium fluoride hydrate composite colloidal particles and a UV-curable or heat-curable resin have a low refractive index of 1.3–1.4 and the cured films show a good light transmittance, and thus they can be applied and cured on glass lenses, plastic lenses, glass plates, transparent plastic plates, transparent plastic films, surface of display screens such as cathode ray tubes or liquid crystal displays, color filters and the like, and a coating film having a good antireflective property can be obtained.

The following examples further illustrate the present invention, in which the term "parts" means "parts by weight".

EXAMPLES

Example 1

(a) Step (a):

To 358 g of a silica sol having a primary particle diameter of 5.0 nm (the Sears method) (37.9 g as $SiO_2$) (trade name SNOWTEX OXS from Nissan Chemical Industries Ltd.; specific gravity 1.060, viscosity 1.2 mPa.s, pH 2.8, $SiO_2$ 10.6% by weight) was added 3000 g of pure water to prepare 3358 g of a silica sol having a silica content of 1.13% by weight.

In 2214 g of pure water was dissolved 246 g of magnesium chloride ($MgCl_2.6H_2O$, special reagent grade, Koso Chemical) (115.2 g as $MgCl_2$, 1.21 mol) to prepare 2460 g of an aqueous solution containing 4.68% by weight magnesium chloride (as $MgCl_2$). On the other hand, after 69.0 g of acidic ammonium fluoride ($NH_4F.HF$, special reagent grade, Morita Chemical Industries) was dissolved in 2093 g of pure water, 73.5 g of 28% aqueous ammonia (reagent grade, Koso Chemical) was added to prepare 2236 g of an aqueous solution containing 4.01% by weight ammonium fluoride (89.6 g as $NH_4F$, 2.42 mol).

In a 10 L vessel charged with 3375 g of said silica sol, 2460 g of said aqueous magnesium chloride solution and then 125 g of an aqueous solution containing 10% by weight hydrochloric acid were added with vigorous stirring with a disper. After further stirring for 10 minutes, 2236 g of said aqueous ammonium fluoride solution was added over 15 minutes with stirring and then stirring was continued for further 1 hour to give 8179 g of a slurry of silica-magnesium fluoride hydrate composite colloidal particles.

This slurry had a pH of 3.75, an electric conductivity of 35 mS/cm, a silica concentration of 0.463% by weight as $SiO_2$, a magnesium fluoride hydrate concentration of 0.922% by weight as $MgF_2$ (75.4 g as $MgF_2$), and a silica-magnesium fluoride hydrate composite colloid concentration of 1.385% by weight as $SiO_2+MgF_2$. The ratio between silica and magnesium fluoride hydrate was 0.50 in an $SiO_2/MgF_2$ weight ratio and the ratio between magnesium and fluorine was 2.0 in an F/Mg molar ratio.

The resulting slurry showed a clear colloidal color similar to that of the sol, but had a tendency to sediment when allowed to stand.

(b) Step (b):

The slurry of silica-magnesium fluoride hydrate composite colloidal particles obtained in step (a) (8179 g) was washed by filtration using a flat sheet membrane ultrafiltration apparatus (Pellicon cassette system, Millipore Corp.) and a UF membrane having a molecular weight cutoff of 100,000 (membrane area 0.46 $m^2$) (Millipore Corp.) under intermittent feeding of 32 kg of pure water. As the pH of the solution increased by filtration, 13 g of a 10% aqueous hydrochloric acid solution was added in portions during this washing process in order to adjust the pH of the slurry to 4–5. The liquid temperature was 25° C. and the filtration time was 26 hours. Filtration was followed by concentration in the ultrafiltration apparatus to give 1200 g of an aqueous sol of silica-magnesium fluoride hydrate composite colloidal particles. The resulting sol had a pH of 4.45, an electric conductivity of 570 μS/cm, and a silica-magnesium fluoride hydrate composite colloid concentration of 7.84% by weight as $SiO_2+MgF_2$ and the silica/magnesium fluoride hydrate ratio was 0.40 in $SiO_2/MgF_2$ weight ratio as determined by fluorescent X-ray elemental analysis. The yield was 83%. An electron-microscopic analysis revealed that the primary particle diameter of this silica-magnesium fluoride hydrate composite colloid was 10–15 nm. This sol was stable for 2 months or more even at room temperature.

The powder X-ray diffraction pattern of the product obtained by drying the aqueous sol at 110° C. was identical to the diffraction pattern of magnesium fluoride hydrate $MgF_2.nH_2O$ where n=0.25–0.5. Silica components were not found on the X-ray diffraction because they were amorphous. The results of differential thermal analysis did not show any distinct endothermic peak, but a weight loss of about 10% by weight was observed at 100° C.–300° C., demonstrating that the product obtained by drying the aqueous sol was a hydrate.

(c) Step (c):

The aqueous sol of silica-magnesium fluoride hydrate composite colloidal particles obtained in step (b) above (670 g) ($SiO_2+MgF_2$ 52.5 g) was subjected to solvent-replacement by continuously charging with about 18 L of methanol at a liquid temperature of 20–30° C. under reduced pressure in a rotary evaporator to give 426 g of a methanol sol comprising silica-magnesium fluoride hydrate composite colloidal particles. The resulting methanolic sol of silica-magnesium fluoride hydrate composite colloidal particles had a specific gravity of 0.861, a pH of 7.20 when diluted with water in a ratio of 1:1, a viscosity of 1.6 mPa.s, a concentration of 12.3% by weight (as $SiO_2+MgF_2$), a moisture content of 0.26% by weight, a transmittance of 69.4% and a particle diameter of 137 nm when determined by dynamic light scattering analysis (measured by N4 from Coulter).

Predetermined amounts of a silane coupling agent hydrolyzate and the above methanolic sol were mixed and applied on a silicon wafer to form a coating. The refractive index of the silica-magnesium fluoride hydrate composite colloid calculated from the refractive index of this coating was 1.39.

The resulting sol was stable without thickening or gelling after being allowed to stand at room temperature for 3 months or more.

(d) Preparation of a UV-curable Transparent Hard Coating Material Having a Low Refractive Index The UV-curable transparent hard coating material (D1) of the present invention having a low refractive index was obtained by thoroughly mixing 50 parts of the methanolic sol (solid content 12.3%; Nissan Chemical Industries Ltd.) of silica-magnesium fluoride hydrate composite colloidal particles obtained in step (c) with 50 parts of the UV-curable resin composition (d1) obtained by thoroughly mixing 11.1 parts of a UV-curable resin KAYARAD DPHA (Nippon Kayaku) as a binder, 1.0 part of a photopolymerization initiator Irgacure 184 (Ciba-Geigy), 5.3 parts of toluene, 41.3 parts of methanol and 41.3 parts of IPA.

(e) Preparation of a Coating Film

A coating layer was formed by applying the transparent hard coating material (D1) obtained as above (Coating Lot No.8) on a substrate (HR-041 from Nippon Kayaku) obtained by applying a hard coating material having a high refractive index (refractive index of the coating film 1.60) on a polyester film with a thickness of 188 μm (A4300, Toyobo). After the solvent is dried, the coating layer is cured under UV irradiation to give a film having an antireflective hard coating layer of the present invention (F1). This film was measured for total transmittance, haze, reflectance at 550 nm, luminous reflectance at wavelength 380 nm–780 nm and adhesion (tape peel test on checks). The results are shown in Table 1.

Example 2

(a) Step (a):

To 188 g of a silica sol having a primary particle diameter of 5.0 nm (the Sears test) (19.9 g as $SiO_2$) (trade name SNOWTEX OXS from Nissan Chemical Industries Ltd.; specific gravity 1.060, viscosity 1.2 mPa.s, pH 2.8, $SiO_2$ 10.6% by weight) was added 3000 g of pure water to prepare 3188 g of a silica sol having a silica concentration of 0.624% by weight.

In 2214 g of pure water was dissolved 246 g of magnesium chloride ($MgCl_2 \cdot 6H_2O$, special reagent grade, Koso Chemical) (115.2 g as $MgCl_2$, 1.21 mol) to prepare 2460 g of an aqueous solution of 4.68% by weight (as $MgCl_2$) magnesium chloride. On the other hand, after 71.4 g of acidic ammonium fluoride ($NH_4F \cdot HF$, special reagent grade, Morita Chemical Industries) was dissolved in 2200 g of pure water, 72.1 g of 28% aqueous ammonia (reagent grade, Koso Chemical) was added to prepare 2344 g of an aqueous solution of 3.95% by weight ammonium fluoride (92.7 g as $NH_4F$, 2.50 mol) ($NH_4/F$ molar ratio 0.974).

In a 10 L vessel charged with 3188 g of said silica sol, 2460 g of said aqueous magnesium chloride solution was added with vigorous stirring with a disper. After further stirring for 15 minutes, 2344 g of said aqueous ammonium fluoride solution was added over 15 minutes with stirring and then stirring was continued for further 1.5 hours to give 7992 g of a slurry of silica-magnesium fluoride hydrate composite colloidal particles.

This slurry had a pH of 4.37, an electric conductivity of 36.1 mS/cm, a silica concentration of 0.249% by weight as $SiO_2$, a magnesium fluoride hydrate concentration of 0.943% by weight as $MgF_2$ (75.4 g as $MgF_2$), and a silica-magnesium fluoride hydrate composite colloid concentration of 1.192% by weight. The ratio between silica and magnesium fluoride hydrate was 0.264 in an $SiO_2/MgF_2$ weight ratio and the ratio between magnesium and fluorine was 2.07 in a F/Mg molar ratio.

The resulting slurry showed a clear colloidal color similar to that of the sol immediately after preparation, but had a tendency to sediment when allowed to stand overnight.

(b) Step (b):

The slurry obtained in step (a) above was allowed to stand for 1 day, then 400 g of the (clear) supernatant was removed and 500 g of pure water was added, and the mixture was stirred with a disper for 1 hour to give 8992 g of a slurry.

This slurry did not show any distinct sedimentation after being allowed to stand overnight. This slurry was washed by filtration using a flat sheet membrane ultrafiltration apparatus (Pellicon cassette system, Millipore Corp.) and a UF membrane having a molecular weight cutoff of 100,000 (membrane area 0.46 m$^2$) (Millipore Corp.) under intermittent feeding of 15 kg of pure water. The liquid temperature was 25° C. and the filtration time was 18 hours. Filtration was followed by concentration in the ultrafiltration apparatus to give 912 g of an aqueous sol of silica-magnesium fluoride hydrate composite colloidal particles. The resulting sol had a pH of 5.04, an electric conductivity of 820 μS/cm, and a silica-magnesium fluoride hydrate composite colloid concentration of 7.42% by weight as $SiO_2+MgF_2$, and the silica/magnesium fluoride hydrate ratio was 0.07 in $SiO_2/MgF_2$ weight ratio as determined by fluorescent X-ray elemental analysis. The yield was 71%. An electron-microscopic analysis revealed that the primary particle diameter of this silica-magnesium fluoride hydrate composite colloid was 10–15 nm. This sol was stable for 3 months or more at room temperature.

The powder X-ray diffraction pattern of the product obtained by drying the aqueous sol at 110° C. was identical to the diffraction pattern of magnesium fluoride hydrate $MgF_2 \cdot nH_2O$ where n=0.25–0.5. Silica components were not found on the X-ray diffraction because they were amorphous. The results of differential thermal analysis did not show any distinct endothermic peak, but a weight loss of about 10% by weight was observed at 100° C.–300° C., demonstrating that the product obtained by drying the aqueous sol was a hydrate.

(c) Step (c):

The aqueous sol of silica-magnesium fluoride hydrate composite colloidal particles obtained in step (b) above (694 g) ($SiO_2+MgF_2$ 51.5 g) was subjected to solvent replacement by continuously charging with about 15 L of methanol at a liquid temperature of 20–30° C. under reduced pressure in a rotary evaporator to give 373 g of a methanolic sol comprising silica-magnesium fluoride hydrate composite colloidal particles. The resulting methanolic sol of silica-magnesium fluoride hydrate composite colloidal particles had a specific gravity of 0.874, a pH of 4.76 when diluted with water in a ratio of 1:1, a viscosity of 2.5 mPa.s, a concentration of 13.8% by weight (as $SiO_2+MgF_2$), a moisture content of 0.67% by weight, a transmittance of 84.2% and a particle diameter of 115 nm as determined by dynamic light scattering analysis (measured by N4 from Coulter).

Predetermined amounts of a silane coupling agent hydrolyzate and the above methanolic sol were mixed and applied on a silicon wafer to form a coating. The refractive index of the silica-magnesium fluoride hydrate composite colloid calculated from the refractive index of this coating was 1.33.

The resulting sol was stable without thickening or gelling after being allowed to stand at room temperature for 3 months or more.

(d) Preparation of a UV-curable Transparent Hard Coating Material Having a Low Refractive Index A UV-curable transparent hard coating material (D2) of the present invention having a low refractive index was obtained by thoroughly mixing 50 parts of the methanolic sol (solid content 12.3% by weight; Nissan Chemical Industries Ltd.) of silica-magnesium fluoride hydrate composite colloidal particles obtained in step (c) with 50 parts of a UV-curable resin composition (d2) obtained by thoroughly mixing 12.7 parts of the UV-curable resin having one or more (meth)acryloyl groups in one molecule KAYARAD DPHA (Nippon Kayaku), 1.1 parts of the photopolymerization initiator Irgacure 184 (Ciba-Geigy), 6.0 parts of toluene, 40.1 parts of methanol and 40.1 parts of IPA.

(e) Preparation of a Coating Film

A coating layer was formed by applying the transparent hard coating material (D2) obtained as above (Coating Lot No. 4) on a substrate (HR-041 from Nippon Kayaku) obtained by applying a hard coating material having a high refractive index (refractive index of the coating film 1.60) coated on a polyester film with a thickness of 188 µm (A4300, Toyobo). After the solvent was dried, the coating layer was cured under UV irradiation to give a film having an antireflective hard coating layer of the present invention (F2). This film was measured for total transmittance, haze, reflectance at 550 nm, luminous reflectance at wavelength 380 nm–780 nm and adhesion (tape peel test on checks). The results are shown in Table 1.

Example 3

A methanolic sol of silica-magnesium fluoride hydrate composite colloidal particles was obtained by the procedures which were exactly the same as steps (a), (b) and (c) in Example 2. A UV-curable transparent low refractive index hard coating material (D3) of the present invention was obtained by thoroughly mixing 66.7 parts of this methanolic sol of silica-magnesium fluoride hydrate composite colloidal particles (solid content 13.8% by weight; Nissan Chemical Industries) with 33.3 parts of the UV-curable resin composition (d2) obtained in Example 2 as a binder.

(e) Preparation of a Coating Film

A coating layer was formed by applying the transparent hard coating material (D3) obtained as above (Coating Lot No.4) on a substrate (HR-041 from Nippon Kayaku) obtained by applying a hard coating material having a high refractive index (refractive index of the coating film 1.60) coated on a polyester film with a thickness of 188 µm (A4300, Toyobo). After the solvent was dried, the coating layer was cured under UV irradiation to give a film having an antireflective hard coating layer of the present invention (F3). This film was measured for total transmittance, haze, reflectance at 550 nm, luminous reflectance at wavelength 380 nm–780 nm and adhesion (tape peel test on checks). The results are shown in Table 1.

Example 4

A methanolic sol of silica-magnesium fluoride hydrate composite colloidal particles was obtained by the procedures which were exactly the same as steps (a), (b) and (c) in Example 2. A heat-curable transparent hard coating material (D4) of the present invention having a low refractive index was obtained by thoroughly mixing 50 parts of this methanolic sol (solid content 13.8%; Nissan Chemical Industries) of silica-magnesium fluoride hydrate composite colloidal particles with 28 parts of a heat-curable silicone-based hard coating material KP-854 (solid content 25%; Shin-Etsu Chemical) as a binder and 22 parts of IPA.

(e) Preparation of a Coating Film

A coating layer was formed by applying the heat-curable transparent hard coating material having a low refractive index (D4) obtained as above (Coating Lot No.4) on a substrate (HR-041 from Nippon Kayaku) comprising a high refractive index hard coating material (refractive index of the coating film 1.60) coated on a polyester film with a thickness of 188 µm (A4300, Toyobo). After the solvent was dried, the coating layer was cured in a drying oven at 120° C. for 60 minutes to give a film having an antireflective hard coating layer of the present invention (F4). This film was measured for total transmittance, haze, reflectance at 550 nm, luminous reflectance at wavelength 380 nm–780 nm and adhesion (tape peel test on checks). The results are shown in Table 1.

Comparative Example 1

(d) Preparation of a UV-curable Hard Coating Material

A UV-curable hard coating material (D5) was obtained by mixing 12.7 parts of a UV-curable resin KAYARAD DPHA (Nippon Kayaku), 1.1 parts of a photopolymerization initiator Irgacure 184 (Ciba-Geigy), 6.0 parts of toluene, 40.1 parts of methanol and 40.1 parts of IPA and thoroughly stirring the mixture.

(e) Preparation of a Coating Film

A coating layer was formed by applying the UV-curable hard coating material (D5) obtained as above (Coating Lot No.8) on a substrate (HR-041 from Nippon Kayaku) obtained by applying a hard coating material having a high refractive index (refractive index of the coating film 1.60) on a polyester film with a thickness of 188 µm (A4300, Toyobo). After the solvent was dried, the coating layer was cured under UV irradiation to give a film having a hard coating layer for comparison (F5). This film was measured for total transmittance, haze, reflectance at 550 nm, luminous reflectance at wavelength 380 nm–780 nm and adhesion (tape peel test on checks). The results are shown in Table 1.

TABLE 1

|  | Ex.1 | Ex.2 | Ex.3 | Ex.4 | Comp. Ex.1 |
|---|---|---|---|---|---|
| Antireflection film | F1 | F2 | F3 | F4 | F5 |
| Low refractive ink (hard coating material) | D1 | D2 | D3 | D4 | D5 |
| Refractive index of low refractive layer | 1.45 | 1.45 | 1.43 | 1.44 | 1.50 |
| Total transmittance (%) | 89.0 | 89.3 | 90.4 | 89.7 | 88.2 |
| Haze (%) | 1.5 | 0.9 | 1.1 | 1.3 | 0.8 |
| Reflectance at 550 nm (%) | 1.36 | 1.14 | 0.66 | 0.90 | 2.52 |
| Luminous reflectance (%) | 2.53 | 1.99 | 1.17 | 1.35 | 4.12 |
| Adhesion | Good | Good | Good | Good | Good |

Table 1 shows that the refractive indices of the cured films of the transparent hard coating materials of the present invention and the luminous reflectances of the films comprising a hard coating layer of the present invention are very low.

ADVANTAGES OF THE INVENTION

The cured films of UV-curable or heat-curable transparent hard coating materials of the present invention show a good transparency and a refractive index, so that these materials can be applied on glass lenses, plastic lenses, glass plates, transparent plastic plates, transparent plastic films, surface of display screens such as cathode ray tubes or liquid crystal displays, color filters and the like to form a coating layer (film) with a good antireflection property.

What is claimed is:

1. A transparent hard coating material comprising a UV-curable resin having one or more (meth)acryloyl groups in one molecule or a heat-curable resin and silica-magnesium fluoride hydrate composite colloidal particles such that the transparent film obtained by curing said transparent hard coating material has a refractive index of 1.48 or less, and wherein said silica-magnesium fluoride hydrate composite colloidal particles are obtained from a sol of silica-magnesium fluoride hydrate composite colloidal particles having a ratio of silica to magnesium fluoride hydrate ($MgF_2 \cdot nH_2O$ where n is 0.25–0.5) of 0.01–5 in an $SiO_2/MgF_2$ weight ratio and a primary particle diameter of 5–50 nm.

2. The transparent hard coating material according to claim 1 wherein the silica-magnesium fluoride hydrate composite colloidal particles have an average particle diameter of 0.5 µm or less.

3. The transparent hard coating material according to claim 1 wherein the sol of silica-magnesium fluoride hydrate composite colloidal particles is an organosol.

4. The transparent hard coating material according to claim 3 wherein the organosol of silica-magnesium fluoride hydrate composite colloidal particles is obtained by the steps of:

(a) adding an aqueous solution of fluorides to a mixture of a silica sol having a primary particle diameter of 3–20 nm and an aqueous solution of magnesium salts in an F/Mg molar ratio of 1.9–2.1 to produce a slurry comprising aggregates of silica-magnesium fluoride hydrate composite colloidal particles, (b) removing by-produced salts in the slurry obtained in step (a), and (c) replacing water of the aqueous sol obtained in step (b) with an organic solvent.

5. A film having a hard coating layer obtained by applying and curing the transparent hard coating material according to any one of claims 1, 2, 3 or 4.

* * * * *